United States Patent
Narita

(10) Patent No.: US 10,761,792 B2
(45) Date of Patent: *Sep. 1, 2020

(54) PRINTING APPARATUS, CONTROL METHOD OF PRINTING APPARATUS AND STORAGE MEDIUM, RELATING TO DETERMINING AN OWNER OF PRINT DATA

(71) Applicant: CANON KABUSHIKI KAISHA, Tokyo (JP)

(72) Inventor: Yuki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,968

(22) Filed: Nov. 14, 2016

(65) Prior Publication Data

US 2017/0139655 A1   May 18, 2017

(30) Foreign Application Priority Data

Nov. 18, 2015 (JP) ................................. 2015-225805

(51) Int. Cl.
*G06F 3/12* (2006.01)
*H04N 1/44* (2006.01)

(52) U.S. Cl.
CPC .......... *G06F 3/1238* (2013.01); *G06F 3/1206* (2013.01); *G06F 3/1222* (2013.01); *G06F 3/1236* (2013.01); *G06F 3/1286* (2013.01); *G06F 3/1292* (2013.01); *H04N 1/4426* (2013.01)

(58) Field of Classification Search
CPC .... G06F 3/1204; G06F 3/1238; G06F 3/1206; G06F 3/1222; G06F 3/1236; G06F 3/1263; G06F 3/1286; G06F 3/1292; G06F 3/1294; H04W 4/008; H04N 1/00103; H04N 1/00244; H04N 1/4426; H04N 2201/0094

USPC ......................................... 358/1.1–1.18, 402

See application file for complete search history.

(56) References Cited

U.S. PATENT DOCUMENTS

| | | | |
|---|---|---|---|
| 9,075,550 B2 * | 7/2015 | Kakutani | G06F 3/1222 |
| 2013/0329253 A1* | 12/2013 | Sasaki | H04N 1/0035 |
| | | | 358/1.15 |
| 2014/0213190 A1 | 7/2014 | Yamaoka | |
| 2015/0093992 A1 | 4/2015 | Tanaka | |
| 2015/0116746 A1 | 4/2015 | Park | |
| 2015/0268904 A1 | 9/2015 | Inoue | |
| 2015/0355875 A1* | 12/2015 | Matsushita | G06F 3/1236 |
| | | | 358/1.15 |
| 2016/0062717 A1* | 3/2016 | Kawasaki | G06F 3/1292 |
| | | | 358/1.15 |

FOREIGN PATENT DOCUMENTS

| | | |
|---|---|---|
| CN | 1417676 A | 5/2003 |
| CN | 104252323 A | 12/2014 |
| CN | 104461410 A | 3/2015 |
| CN | 104754171 A | 7/2015 |

(Continued)

*Primary Examiner* — Gabriel I Garcia
(74) *Attorney, Agent, or Firm* — Canon U.S.A., Inc. I.P. Division

(57) ABSTRACT

A printing apparatus determines a user who is logging into the printing apparatus as a job owner in a case where the printing apparatus receives print data through wireless communication in an access point mode.

23 Claims, 8 Drawing Sheets

(56) References Cited

FOREIGN PATENT DOCUMENTS

| | | |
|---|---|---|
| CN | 104951255 A | 9/2015 |
| JP | 2011-198166 A | 10/2011 |
| JP | 2013-111867 A | 6/2013 |
| JP | 2014-179926 A | 9/2014 |
| JP | 2014-216879 A | 11/2014 |
| JP | 2015-070518 A | 4/2015 |
| KR | 10-2006-0122522 A | 11/2006 |
| KR | 10-1249185 B1 | 4/2013 |
| KR | 10-2015-0050100 A | 5/2015 |

\* cited by examiner

FIG. 4

| USER NAME | USER ID | PASSWORD |
|---|---|---|
| Tanaka | Tanaka1231 | 7bt89a |
| Sato | Sato1010 | yrj47m |
| Yamada | Yamada0707 | zrh2wh |

400 USER MANAGEMENT TABLE

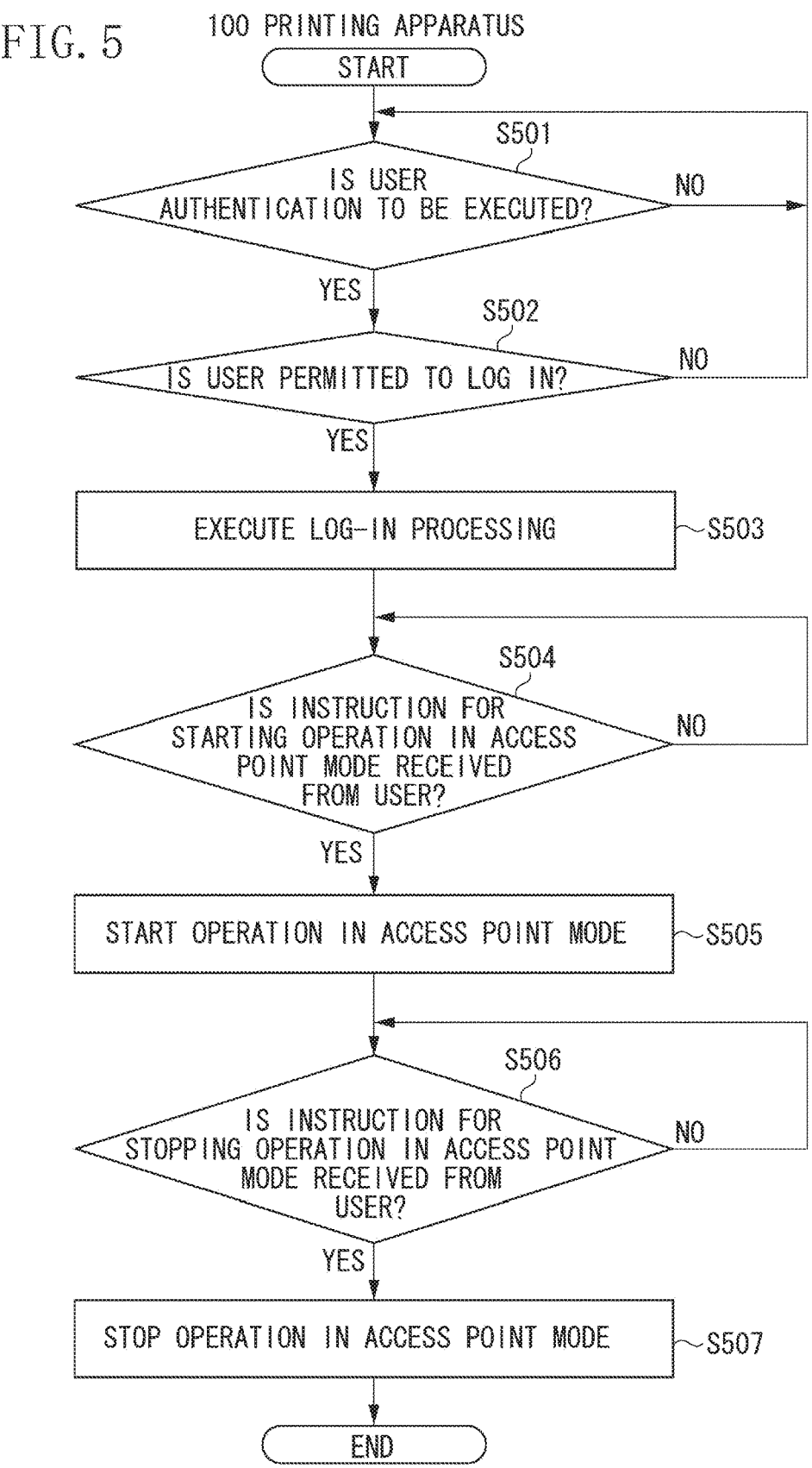

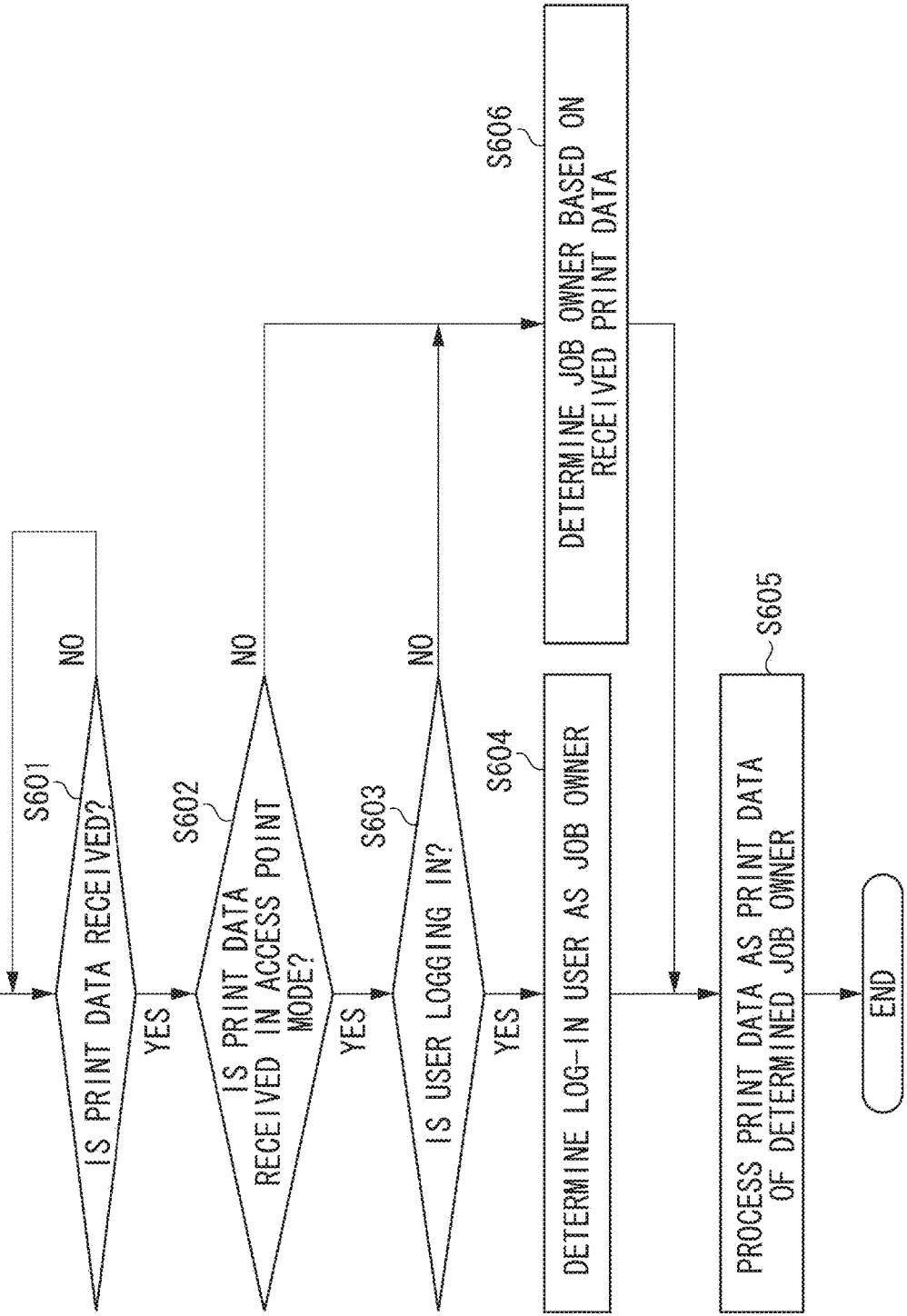

700 PRINT HISTORY SCREEN

710 PRINT HISTORY SCREEN

FIG. 8A
PRIOR ART

RESERVATION PRINTING

PLEASE SELECT PRINT DATA AND PRESS PRINT BUTTON.

| ID | FILE NAME | JOB OWNER |
|---|---|---|
| 001 | CONFERENCE HANDOUT | Tanaka |
| 002 | MANUAL | Sato |
| 003 | Photo.001 | Mobile |

[PRINT]  801

800 RESERVATION PRINTING SCREEN

FIG. 8B

RESERVATION PRINTING

PLEASE SELECT PRINT DATA AND PRESS PRINT BUTTON.

| ID | FILE NAME | JOB OWNER |
|---|---|---|
| 001 | CONFERENCE HANDOUT | Tanaka |
| 002 | MANUAL | Sato |
| 003 | Photo.001 | Yamada |

[PRINT]  811

810 RESERVATION PRINTING SCREEN

PRINTING APPARATUS, CONTROL METHOD OF PRINTING APPARATUS AND STORAGE MEDIUM, RELATING TO DETERMINING AN OWNER OF PRINT DATA

BACKGROUND

Field

The present disclosure relates to a printing apparatus, a control method of the printing apparatus and a storage medium.

Description of the Related Art

A technique in which print data (a print job) is transmitted to a printing apparatus from a personal computer (PC) through a printer driver by installing the printer driver on the PC has been known. An owner of the print job is called a "job owner", and the printer driver attaches user information indicating the job owner to the print data and transmits the print data to the printing apparatus. The printer driver acquires user information of a user who is logging into the PC from an operating system (OS) of the PC, and attaches the user information acquired from the OS to the print data as a job owner. The printing apparatus that receives the print data including the user information can determine the job owner based on the user information included in the print data.

In addition to the PC, a mobile terminal such as a smartphone can also transmit print data to the printing apparatus. The mobile terminal establishes wireless communication with the printing apparatus using a direct wireless function such as an access point mode or Wi-Fi Direct®, and transmits the print data to the printing apparatus. Japanese Patent Application Laid-Open No. 2014-179926 discusses a configuration in which a printing apparatus stops a direct wireless function when printing is completed or a printing apparatus shifts to a power-saving state.

As described, user information of a user who is logging into a PC is attached to print data transmitted by the PC. Accordingly, when a printing apparatus receives print data from the PC, the printing apparatus can determine who is a job owner of the print data based on the received print data. However, the user information of a user of a mobile terminal is not included in the print data transmitted by the mobile terminal. Accordingly, when the printing apparatus receives the print data from the mobile terminal, the printing apparatus cannot determine who is a job owner of the print data received from the mobile terminal.

SUMMARY

A printing apparatus includes a wireless local area network interface including a direct wireless function that executes wireless communication between the printing apparatus and an external apparatus, a memory, and a processor that executes instructions stored in the memory to determine a user who is logging into the printing apparatus as an owner of print data in a case where the printing apparatus receives the print data by using wireless communication through the direct wireless function.

Further features will become apparent from the following description of exemplary embodiments with reference to the attached drawings.

BRIEF DESCRIPTION OF THE DRAWINGS

FIG. 4 is a diagram illustrating a user management table.

FIG. 5 is a flowchart illustrating processing executed when the printing apparatus starts an operation in an access point mode.

FIG. 6 is a flowchart illustrating processing executed when the printing apparatus receives print data.

FIGS. 8A and 8B are diagrams illustrating reservation print screens.

DESCRIPTION OF THE EMBODIMENTS

Hereinafter, an exemplary embodiment will be described with reference to the appended drawings. Further, the exemplary embodiment described hereinafter is not intended to limit the content of the invention as described in the appended claims, and not all of the combinations of features described in the exemplary embodiment are necessary for a solution to the issue.

Figure 1:
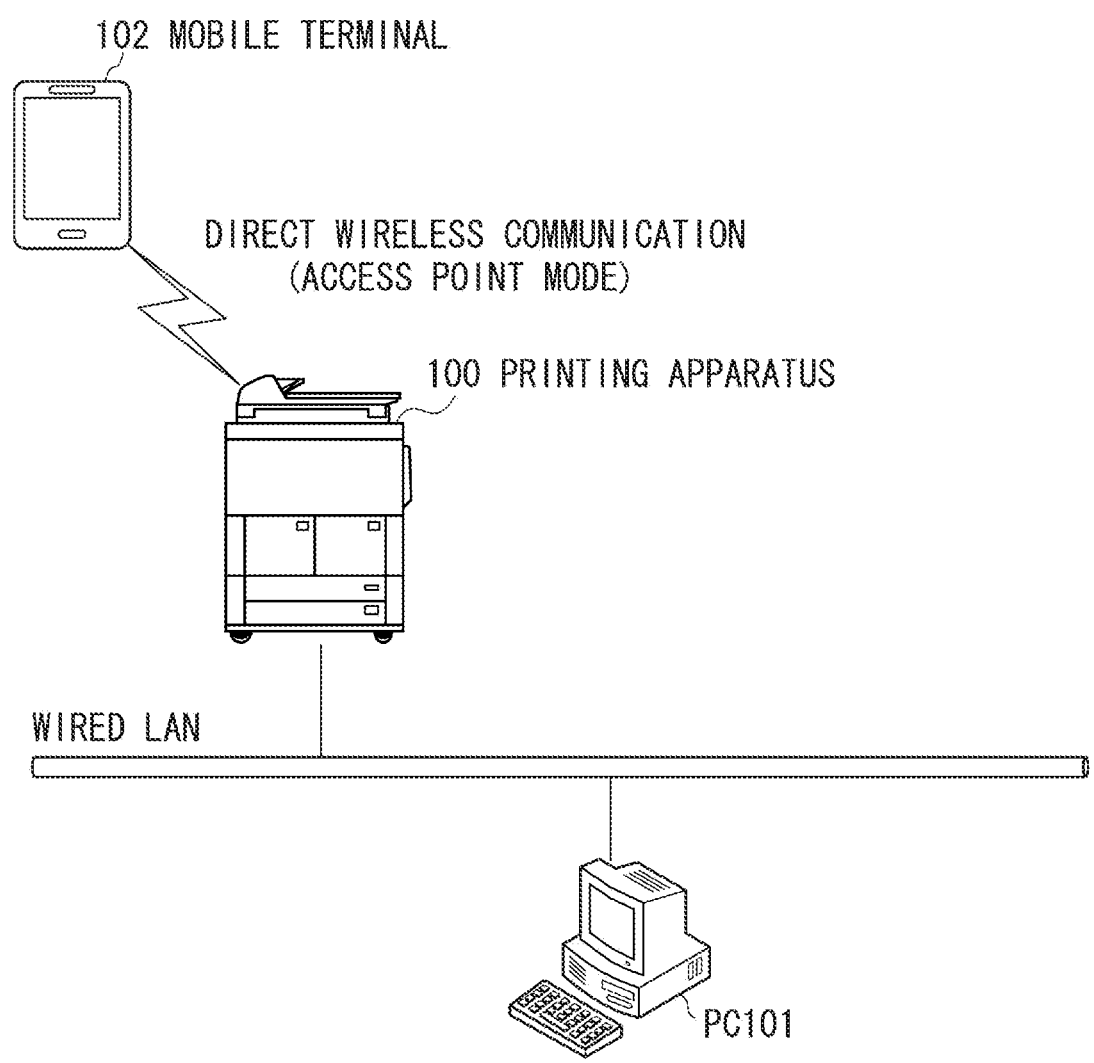
FIG. 1 is a diagram illustrating an overview of a printing system.

An overview of the printing system will be described with reference to FIG. 1. A printing apparatus 100 is connected to a wired local area network (LAN) through a LAN cable. A personal computer (PC) 101 is connected to the wired LAN, and the PC 101 transmits print data to the printing apparatus 100. The printing apparatus 100 executes printing processing based on the received print data.

The PC 101 attaches user information to the print data as a transmission target. The user information indicates a job owner of the print data. The PC 101 acquires the user information of a user who is logging into the PC 101 from an operating system (OS) of the PC 101 and attaches the acquired user information to the print data. The printing apparatus 100 determines the job owner of the print data by referring to the user information attached to the print data. The printing apparatus 100 can use the information about the determined job owner in various ways. For example, according to job owner's authority previously set on the printing apparatus 100, the printing apparatus 100 can determine whether to permit or prohibit execution of printing processing. In addition, for example, the printing apparatus 100 can store a print history by using a name of the job owner when the printing apparatus 100 completes the printing processing.

The printing apparatus 100 includes a wireless LAN function. The wireless LAN function included in the printing apparatus 100 includes two types of wireless communication modes: an infrastructure mode and an access point mode. The infrastructure mode is a wireless communication mode in which the printing apparatus 100 wirelessly connects to an access point (not illustrated) to communicate with a device on a network such as the PC 101.

The access point mode is a wireless communication mode in which the printing apparatus 100 itself operates as an access point by activating a software access point in the printing apparatus 100. A mobile terminal 102, such as a smartphone, wirelessly connects to the printing apparatus 100 operating in the access point mode and transmits print data for printing an electronic file, such as a picture, to the printing apparatus 100. Wireless communication can be directly established between the printing apparatus 100 and the mobile terminal 102 through the access point mode without interposing a relay apparatus, such as the access point. In addition, the access point mode is an example of the direct wireless communication mode that enables the printing apparatus 100 and the mobile terminal 102 to directly establish the wireless communication. Another wireless communication method such as Wi-Fi Direct® can be applied to the present exemplary embodiment instead of the access point mode.

Typically, when the mobile terminal 102 transmits print data to the printing apparatus 100, information attached to the print data is device type information of the mobile terminal 102 or a letter string such as "Mobile". Accordingly, the printing apparatus 100 cannot determine who the job owner of the print data is when the print data is received from the mobile terminal 102. In order to solve such issue, the present exemplary embodiment provides a mechanism to enable a user who is logging into the printing apparatus 100 at the time of receiving the print data to be determined as a job owner.

Figure 2:
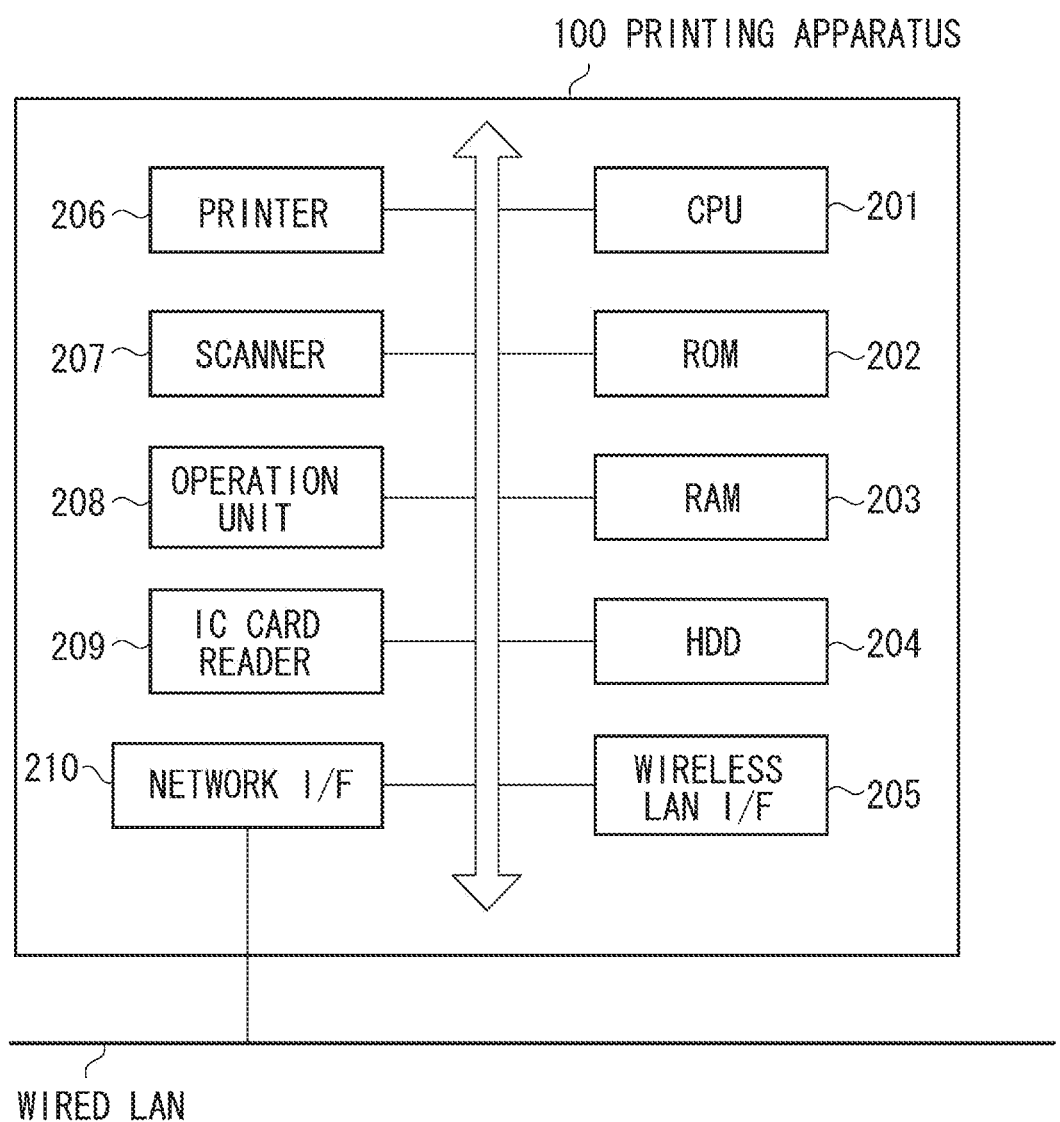
FIG. 2 is a block diagram illustrating a hardware configuration of a printing apparatus.

A hardware configuration of the printing apparatus 100 will be described with reference to FIG. 2. A central processing unit (CPU) 201 reads a control program stored in a read only memory (ROM) 202 to execute various types of processing for controlling operations of the printing apparatus 100. The ROM 202 stores the control program. A random access memory (RAM) 203 is used as a temporary storage area such as a main memory or a work area of the CPU 201. A hard disk drive (HDD) 204 is a non-volatile storage medium for storing various kinds of data.

In the printing apparatus 100, although the single CPU 201 executes processing illustrated in the flowcharts described below, the exemplary embodiment is not limited thereto. For example, a plurality of CPUs can cooperatively execute the processing illustrated in the below-described flowcharts. A part of the processing illustrated in the below-described flowcharts can also be executed by using a hardware circuit such as an application specific integrated circuit (ASIC).

A wireless LAN interface (I/F) 205 executes wireless LAN communication with the mobile terminal 102 or an external apparatus such as the access point. The wireless LAN communication executed by the wireless LAN I/F 205 is the wireless communication compliant with the Institute of Electrical and Electronics Engineers (IEEE) 802.11a/b/g/n/ac. The wireless LAN I/F 205 can operate in the infrastructure mode and the access point mode. According to a device setting previously set, the wireless LAN I/F 205 operates by selecting either the infrastructure mode or the access point mode.

A network I/F 210 connects to the wired LAN via a LAN cable. The network I/F 210 can communicate with the external apparatus (e.g., PC) on the wired LAN.

A printer 206 executes printing processing on a sheet based on the print data received through the wireless LAN I/F 205 or the network I/F 210. A scanner 207 reads a document placed by the user and generates a document image. The document image generated by the scanner 207 is printed by the printer 206 or stored in the HDD 204.

An operation unit 208 includes a liquid crystal display unit including a touch panel function or a keyboard, and displays various operation screens. The user can input an instruction or information to the printing apparatus 100 through the operation unit 208.

An integrated circuit (IC) card reader 209 reads user information from an IC card. In the present exemplary embodiment, a user identification (ID) and a password are stored in the IC card as the user information. The printing apparatus 100 executes user authentication based on the user information read from the IC card through the IC card reader 209.

When a user of the mobile terminal 102 wants to print, for example, a picture stored in the mobile terminal 102, the user users the access point mode to directly connect the mobile terminal 102 to the printing apparatus 100 wirelessly. This operation procedure will be described with reference to FIGS. 3A, 3B, 3C, and 3D.

Figure 3A:
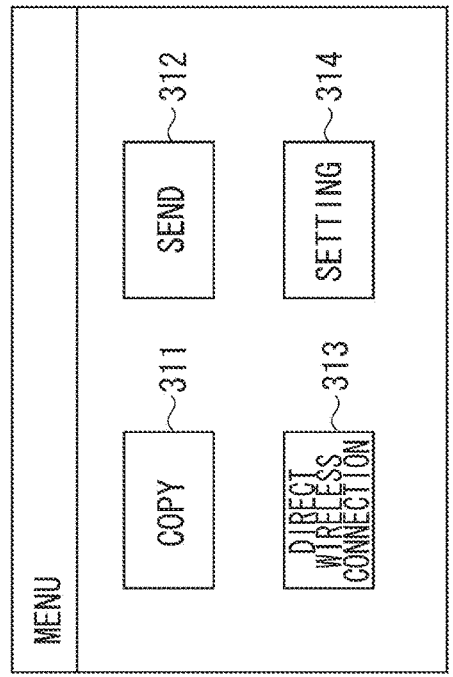
FIGS. 3A, 3B, 3C, and 3D are diagrams illustrating screens displayed by the printing apparatus.
Figure 3B:
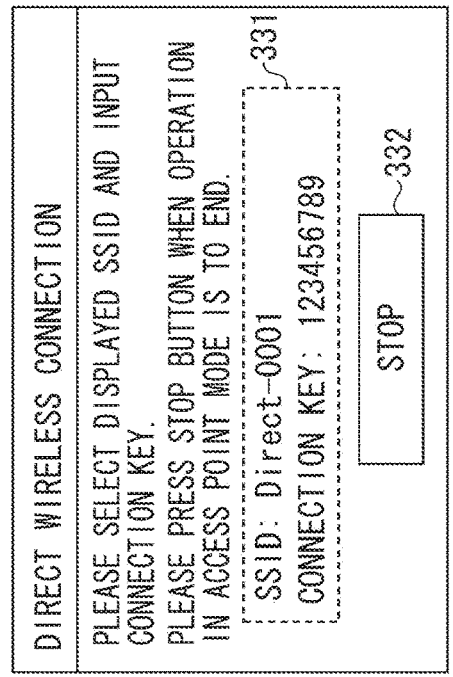
Figure 3C:
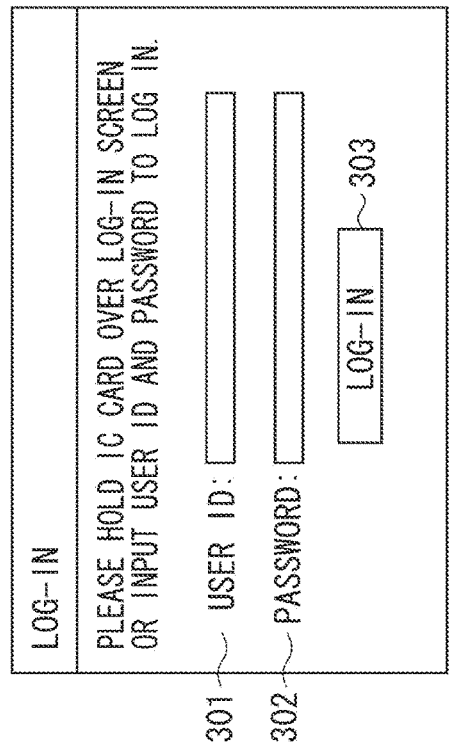
Figure 3D:
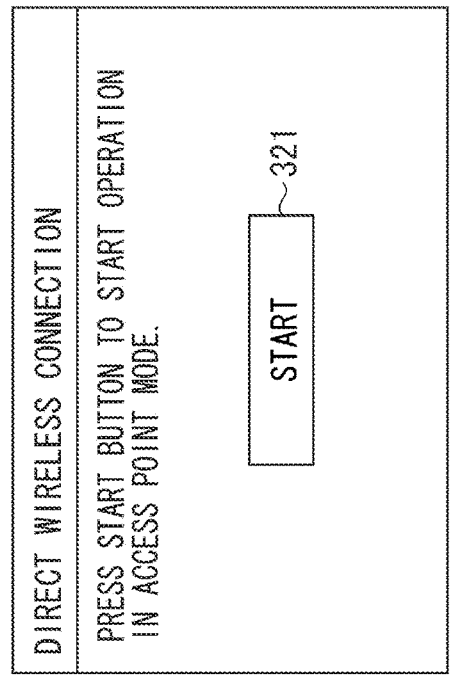

A log-in screen 300 in FIG. 3A is displayed on the operation unit 208 of the printing apparatus 100. When an activation operation of the printing apparatus 100 is completed, the operation unit 208 initially displays the log-in screen 300. The user holds the user's IC card over the IC card reader 209 to authenticate the user.

A user management table 400 in FIG. 4 is the information for managing a user who is permitted to log into the printing apparatus 100, which is stored in the HDD 204 of the printing apparatus 100. The user who is registered in the user management table 400 can log into the printing apparatus 100. When the user holds the user's IC card over the IC card reader 209, the IC card reader 209 reads the user information (a user ID and a password) from the IC card. Then, the CPU 201 determines whether the user information read from the IC card through the IC card reader 209 is registered in the user management table 400. The authentication succeeds if the user information read from the IC card is registered in the user management table 400, which enables the user indicated by the user information to log into the printing apparatus 100. Therefore, the user who has logged into the printing apparatus 100 can use the printing apparatus 100. The authentication fails if the user information read from the IC card is not registered in the user management table 400, which results in the operation unit 208 notifying the user of the authentication failure and does not display a menu screen 310.

According to the present exemplary embodiment, the user may respectively input the user ID and the password to input columns 301 and 302 without using the IC card reader 209. When the user inputs the user ID and the password to the input columns 301 and 302 and presses a log-in button 303, the CPU 201 executes the user authentication.

The user management table 400 can be included in an external authentication server instead of the printing apparatus 100. In a case where the user management table 400 is included in the authentication server, the printing apparatus 100 transmits the user information to the authentication server. Then, when the printing apparatus 100 receives a result of the authentication processing (authentication success or authentication failure) from the authentication server, the CPU 201 executes the user authentication.

Buttons for the user to use the functions provided by the printing apparatus 100 are displayed on the menu screen 310. A button 311 is for the user to use a copy function. When the user presses the button 311, the operation unit 208 displays a copy screen (not illustrated).

A button 312 is for the user to use a SEND function, i.e., a function for transmitting a document image generated by the scanner 207 to an external apparatus. When the user presses the button 312, the operation unit 208 displays a SEND screen (not illustrated).

A button 314 is for the user to execute a device setting of the printing apparatus 100. When the user presses the button 314, the operation unit 208 displays a setting screen (not illustrated).

A button 313 is for the user to use the access point mode. When the user uses the access point mode, the user first presses the button 313. When the user presses the button 313, the operation unit 208 displays a wireless connection screen 320 illustrated in FIG. 3C.

A start button 321 is displayed on the wireless connection screen 320. The user uses the start button 321 to instruct the printing apparatus 100 to start the operation in the access point mode. When the user presses the start button 321, the printing apparatus 100 starts the operation in the access point mode. Then, the operation unit 208 displays a wireless connection screen 330 in FIG. 3D.

When the printing apparatus 100 operates in the access point mode, the printing apparatus 100 generates a service set identifier (SSID) and a connection key, such as a wired equivalent privacy (WEP) key. The SSID and the connection key generated by the printing apparatus 100 are displayed on a region 331 of the wireless connection screen 330. The SSID generated herein can be a random SSID, e.g., one-time SSID or the same SSID can be generated on each occasion, e.g., fixed SSID.

The user checks the content displayed on the region 331, uses the user's mobile terminal 102 to search for a peripheral access point, and selects the SSID displayed on the region 331 from a list of search results. Then, when the user inputs the connection key displayed on the region 331 to the mobile terminal 102, the wireless connection based on the access point mode is established between the printing apparatus 100 and the mobile terminal 102.

After the user wirelessly connects the mobile terminal 102 to the printing apparatus 100 by using the access point mode, the user, for example, selects a picture on the mobile terminal 102 to be printed. When the user inputs a printing instruction to the mobile terminal 102, the mobile terminal 102 transmits the print data to the printing apparatus 100 using wireless communication in the access point mode. The mobile terminal 102 attaches a letter string "Mobile" to the print data as the information indicating a job owner.

A stop button 332 is displayed on the wireless connection screen 330. The stop button 332 receives a stop instruction for stopping the operation in the access point mode from the user. The user presses the stop button 332 to stop the operation of the printing apparatus 100 in the access point mode. When the printing apparatus 100 operates in the access point mode, power consumption of the printing apparatus 100 is increased. Accordingly, it is desirable for the user to press the stop button 332 when the user wishes to end the use of the access point mode.

Processing executed by the printing apparatus 100 when the user uses the access point mode will be described with reference to a flowchart in FIG. 5. Each of the steps illustrated in the flowchart in FIG. 5 is processed when the CPU 201 executes a control program stored in a memory, such as the ROM 202, by loading the control program into the RAM 203.

In step S501, the CPU 201 determines whether the user authentication is to be executed. The CPU 201 determines that the user authentication is to be executed (YES in step S501) if the IC card reader 209 reads the user information from the IC card or the user inputs the user's ID and the password to the input columns 301 and 302 and presses the log-in button 303. Then the processing proceeds to step S502.

In step S502, the CPU 201 determines whether the user indicated by the user information is permitted to log in. The CPU 201 executes the determination by checking whether the user information is registered in the user management table 400. If the user information is registered in the user management table 400 (YES in step S502), the processing proceeds to step S503, i.e., authentication successful. If the user information is not registered in the user management table 400 (NO in step S502), the processing returns to step S501, i.e., authentication failed.

Next, in step S503, the CPU 201 executes log-in processing. Specifically, the CPU 201 controls the operation unit 208 to display the menu screen 310 in FIG. 3B. As part of the log-in processing, the CPU 201 stores a user name indicated by the user information in the RAM 203 as the information indicating the user who is logging into the printing apparatus 100. With this log-in processing, the user is allowed to use the printing apparatus 100. A user of the user name stored in step S503 is determined as a job owner of the print data received in the access point mode as described in more detail below. When the user executes a log-out operation or a predetermined time, e.g., 10 minutes, has elapsed without a user operation, the CPU 201 executes log-out processing and deletes the user name stored in the RAM 203.

In step S504, the CPU 201 determines whether an instruction for starting an operation in the access point mode is received from the user. In the present exemplary embodiment, when the user presses the start button 321 of the wireless connection screen 320 in FIG. 3C, the CPU 201 determines that the instruction for starting the operation in the access point mode is received from the user (YES in step S504), and the processing proceeds to step S505.

In step S505, the CPU 201 starts the operation in the access point mode. The CPU 201 generates a SSID and a connection key, and controls the wireless LAN I/F 205 to operate in the access point mode. When the wireless LAN I/F 205 starts the operation in the access point mode, the CPU 201 controls the operation unit 208 to display the wireless connection screen 330 in FIG. 3D.

In step S506, the CPU 201 determines whether an instruction for stopping the operation in the access point mode is received from the user. In the present exemplary embodiment, when the user presses the stop button 332 of the wireless connection screen 330 in FIG. 3D, the CPU 201 determines that the instruction for stopping the operation in the access point mode is received from the user (YES in step S506), so that the processing proceeds to step S507.

In step S507, the CPU 201 stops the operation in the access point mode. The CPU 201 controls the wireless LAN I/F 205 to stop the operation in the access point mode. When the wireless LAN I/F 205 stops the operation in the access point mode, the CPU 201 controls the operation unit 208 to display the wireless connection screen 320 in FIG. 3C.

Processing executed when the printing apparatus 100 receives the print data will be described with reference to a flowchart in FIG. 6. Each of the steps illustrated in the flowchart in FIG. 6 is processed when the CPU 201 executes a control program stored in a memory such as the ROM 202 by loading the control program into the RAM 203.

In step S601, the CPU 201 determines whether the print data is received. The printing apparatus 100 receives the print data from the external apparatus, such as the PC 101 or the mobile terminal 102, by using the network I/F 210 or the wireless LAN I/F 205. If the CPU 201 determines that the print data is received (YES in step S601), the processing proceeds to step S602.

In step S602, the CPU 201 determines whether the print data is received through wireless communication in the access point mode. The CPU 201 executes the determination by checking an internet protocol (IP) address of destination of the print data. An IP address of the printing apparatus 100 used in the access point mode is different from an IP address used in the infrastructure mode or the wired LAN communication. Accordingly, if the IP address of the destination of the print data conforms to the IP address of the printing apparatus 100 used in the access point mode, the CPU 201 determines that the print data is received through wireless communication in the access point mode. If the IP address of the destination of the print data does not conform to the IP address of the printing apparatus 100 used in the access point mode, the CPU 201 determines that the print data is received through wireless communication in the infrastructure mode or communication through the wired LAN. In addition, for example, the CPU 201 can determine whether the print data is received through wireless communication in the access point mode based on an address port number of the print data instead of the IP address of the destination of the print data.

If the IP address of the destination of the print data conforms to the IP address of the printing apparatus 100 used in the access point mode, the CPU 201 determines that the print data is received through wireless communication in the access point mode (YES in step S602). The processing then proceeds to step S603. If the IP address of the destination of the print data does not conform to the IP address of the printing apparatus 100 used in the access point mode, the CPU 201 determines that the print data is received through communication other than the wireless communication in the access point mode (NO in step S602). The processing then proceeds to step S606.

In step S603, the CPU 201 determines whether the user is logging into the printing apparatus 100. If the user is logging into the printing apparatus 100 (YES in step S603), the processing proceeds to step S604. If the user is not logging into the printing apparatus 100 (NO in step S603), the processing proceeds to step S606.

In step S604, the CPU 201 determines the user who is logging into the printing apparatus 100 as a job owner of the received print data. Through the log-in processing executed in step S503 in FIG. 5, a user name of the user who is logging into the printing apparatus 100 is stored in the RAM 203. For example, if a user name "Yamada" is stored in the RAM 203 through the log-in processing, the CPU 201 determines that the job owner of the received print data is "Yamada".

The processing in step S604 is executed when the printing apparatus 100 receives the print data through wireless communication in the access point mode. It is assumed that transmission sources that transmit print data to the printing apparatus 100 using the access point mode are typically mobile terminals. As previously discussed, in most cases where print data is transmitted from a mobile terminal, the device type information of the mobile terminal or a letter string "Mobile" is attached to the print data, and thus the printing apparatus 100 cannot determine the job owner. In the present exemplary embodiment, a user who is logging into the printing apparatus 100 when the print data is received in the access point mode is regarded as the job owner of the print data received in the access point mode.

In step S606, the CPU 201 determines the job owner of the received print data based on the received print data. The information indicating the job owner is attached to the print job. For example, if the information attached to the print data is "Tanaka", the CPU 201 determines that the job owner of the received print job is "Tanaka".

The processing in step S605 will now be described. In step S605, the CPU 201 processes the received print data as print data of the determined job owner. Three patterns of the processing executed in step S605 will be described below as specific examples.

Pattern 1

Processing for switching whether to permit or prohibit execution of printing based on the information of the determined job owner will now be described. Permission or prohibition of print execution, for each user, is previously set in the printing apparatus 100. In step S605, the CPU 201 determines whether the determined job owner is a user who prohibited from executing printing. If the determined job owner is a user who is permitted to execute printing, the CPU 201 executes printing processing based on the received print data. If the determined job owner is a user who is prohibited from executing printing, the CPU 201 discards the received print data without executing printing processing based on the received print data.

Pattern 2

Figure 7A:
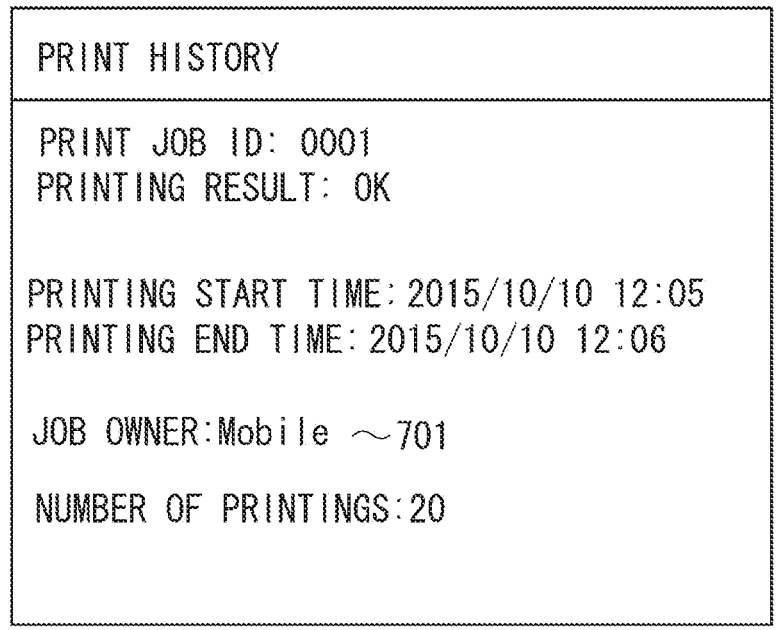
FIGS. 7A and 7B are diagrams illustrating print history screens.

Processing for storing a print history after executing printing processing based on the received print data will now be described. In a conventional printing apparatus, "Mobile" is indicated as a job owner in the print history when the print data is received through wireless communication in the access point mode. A print history screen 700 in FIG. 7A is a screen displayed on the conventional printing apparatus. According to an item 701, a job owner is indicated as "Mobile".

Figure 7B:
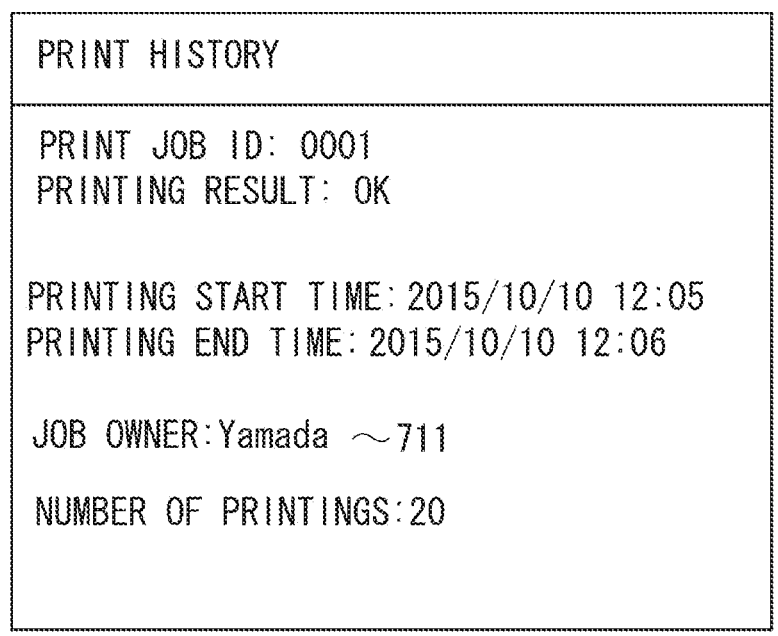

A print history screen 710 in FIG. 7B is a screen displayed on the printing apparatus 100 to which the processing according to the present exemplary embodiment is applied. In step S604, when the printing apparatus 100 receives the print data through wireless communication in the access point mode, the CPU 201 determines a user who is logging into the printing apparatus 100 as the job owner. With this processing, a name of the user, such as "Yamada", can be indicated as a job owner (item 711) in the print history instead of "Mobile".

Pattern 3

Processing for temporarily reserving the received print data without immediately printing, i.e., processing for storing print data in the HDD 204 and executing printing processing after receiving a printing instruction from a user, will now be described. In the conventional printing apparatus, "Mobile" is indicated as a job owner of reserved print data, i.e., print data waiting for a user's printing instruction, when the print data is received through wireless communication in the access point mode. A reservation printing screen 800 in FIG. 8A is a screen displayed on the conventional printing apparatus. According to an item 801, a job owner is indicated as "Mobile".

A reservation printing screen 810 in FIG. 8B is a screen displayed on the printing apparatus 100 to which the processing according to the present exemplary embodiment is applied. In step S604, when the printing apparatus 100 receives the print data through wireless communication in the access point mode, the CPU 201 determines a user who is logging into the printing apparatus 100 as the job owner.

With this processing, a name of the user, such as "Yamada", can be indicated as a job owner (item 811) of the reserved print data instead of "Mobile".

According to the present exemplary embodiment, when the printing apparatus 100 receives print data through wireless communication in the access point mode, the printing apparatus 100 can treat a user who is logging into the printing apparatus 100 as a job owner. Accordingly, the printing apparatus 100 or the user can easily figure out who the job owner is with respect to the case unlike in a conventional case where a job owner is indicated by device type information of a mobile terminal or a letter string "Mobile".

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-225805, filed Nov. 18, 2015, which is hereby incorporated by reference herein in its entirety.

What is claimed is:

1. A printing apparatus comprising:
   a wireless local area network interface including a direct wireless function that executes wireless communication between the printing apparatus and an external apparatus;
   one or more processors; and
   one or more memories storing instructions that, when executed by the one or more processors, cause the printing apparatus to perform operations comprising:
   executing a log-in processing that allows a user to log into the printing apparatus;
   starting the direct wireless function based on an instruction from the user who logs into the printing apparatus;
   receiving print data;
   determining whether the received print data was received using the wireless communication established by the started direct wireless function;
   identifying a user who is currently logged into the printing apparatus at a time that the print data is received using the wireless communication established by the started direct wireless function;
   determining the identified user as an owner of the print data received via the wireless communication established by the started direct wireless function; and
   processing the received print data as print data of the determined owner.

2. The printing apparatus according to claim 1, wherein, in a case where a user is not currently logged into the printing apparatus at a time that the print data is received, the processor determines an owner of the received print data based on information included in the received print data.

3. The printing apparatus according to claim 1, wherein, in a case where the printing apparatus receives the print data by using a communication function different from the direct wireless function, the processor determines an owner of the received print data based on information included in the received print data.

4. The printing apparatus according to claim 3, wherein the communication function different from the direct wireless function is an infrastructure mode of a wireless LAN.

5. The printing apparatus according to claim 3, wherein the communication function different from the direct wireless function is a function that allows the printing apparatus to connect to a wired LAN via a LAN cable.

6. The printing apparatus according to claim 1,
   wherein the processor executes user authentication, and
   wherein the log-in processing is executed when a user is determined to be a log-in permitted user through the user authentication.

7. The printing apparatus according to claim 6 further comprising an integrated circuit (IC) card reader configured to read an IC card,
   wherein the processor executes the user authentication based on user information read from the IC card by the IC card reader.

8. The printing apparatus according to claim 1, wherein the direct wireless function is an access point mode in which the printing apparatus operates as an access point.

9. A control method executed by a printing apparatus including a direct wireless function that executes wireless communication between the printing apparatus and an external apparatus, the control method comprising:
   executing a log-in processing that allows a user to log into the printing apparatus;
   starting the direct wireless function based on an instruction from the user who logs into the printing apparatus;
   receiving print data;
   determining whether the received print data was received using the wireless communication established by the started direct wireless function;
   identifying a user who is currently logged into the printing apparatus at a time that the print data is received using the wireless communication established by the started direct wireless function; and
   processing, as print data of the identified user, the print data received via the wireless communication established by the started direct wireless function.

10. The control method according to claim 9, wherein, in a case where a user is not currently logged into the printing apparatus at a time that the print data is received via the wireless communication established by the started direct wireless function, an owner of the received print data is determined based on information included in the received print data.

11. The control method according to claim 9, further comprising determining, in a case where the printing apparatus receives the print data by using a communication function different from the direct wireless function, an owner of the received print data based on information included in the received print data.

12. The control method according to claim 11, wherein the communication function different from the direct wireless function is an infrastructure mode of a wireless LAN.

13. The control method according to claim 11, wherein the communication function different from the direct wireless function is a function that allows the printing apparatus to connect to a wired LAN via a LAN cable.

14. The control method according to claim 9, further comprising performing user authentication,
wherein the log-in processing is executed when a user is determined to be a log-in permitted user through the user authentication.

15. The control method according to claim 14, wherein the user authentication is performed based on user information obtained from an integrated circuit card.

16. The control method according to claim 9, wherein the direct wireless function is an access point mode in which the printing apparatus operates as an access point.

17. A non-transitory computer readable storage medium storing computer executable instructions for causing a printing apparatus to execute a control method, the printing apparatus including a direct wireless function that executes wireless communication between the printing apparatus and an external apparatus, the control method comprising:
executing a log-in processing that allows a user to log into the printing apparatus;
starting the direct wireless function based on an instruction from the user who logs into the printing apparatus;
receiving print data;
determining whether the received print data was received using the wireless communication established by the started direct wireless function;
identifying a user who is currently logged into the printing apparatus at a time that the print data is received using the wireless communication established by the started direct wireless function; and
determining the identified user as an owner of the print data received via the wireless communication established by the started direct wireless function.

18. A printing apparatus comprising:
a wireless local area network interface including a direct wireless function that executes wireless communication between the printing apparatus and an external apparatus;
one or more processors; and
one or more memories storing instructions that, when executed by the one or more processors, cause the printing apparatus to perform operations comprising:
executing a log-in processing that allows a user to log into the printing apparatus;
starting the direct wireless function based on an instruction from the user who logs into the printing apparatus;
receiving print data via the wireless communication established by the started direct wireless function; and
determining, as an owner of the received print data, a user who is currently logged into the printing apparatus at a time that the print data is received via the wireless communication established by the started direct wireless function.

19. The printing apparatus according to claim 18, wherein, in a case where no user is currently logged into the printing apparatus at a time that the print data is received via the wireless communication established by the started direct wireless function, the processor determines an owner of the received print data based on information included in the received print data.

20. The printing apparatus according to claim 18, wherein, in a case where the printing apparatus receives other print data by using a communication function different from the direct wireless function, the processor determines an owner of the received other print data based on information included in the received other print data.

21. The printing apparatus according to claim 18, wherein the direct wireless function is an access point mode in which the printing apparatus operates as an access point.

22. A control method executed by a printing apparatus including a direct wireless function that executes wireless communication between the printing apparatus and an external apparatus, the control method comprising:
executing a log-in processing that allows a user to log into the printing apparatus;
starting the direct wireless function based on an instruction from the user who logs into the printing apparatus;
receiving print data via the wireless communication established by the started direct wireless function; and
determining, as an owner of the received print data, a user who is currently logged into the printing apparatus at a time that the print data is received via the wireless communication established by the started direct wireless function.

23. A non-transitory computer readable storage medium storing computer executable instructions for causing a printing apparatus to execute a control method, the printing apparatus including a direct wireless function that executes wireless communication between the printing apparatus and an external apparatus, the control method comprising:
executing a log-in processing that allows a user to log into the printing apparatus;
starting the direct wireless function based on an instruction from the user who logs into the printing apparatus;
receiving print data via the wireless communication established by the started direct wireless function; and
determining, as an owner of the received print data, a user who is currently logged into the printing apparatus at a time that the print data is received via the wireless communication established by the started direct wireless function.

* * * * *